US008403737B1

(12) United States Patent
Friedman

(10) Patent No.: US 8,403,737 B1
(45) Date of Patent: Mar. 26, 2013

(54) ROYAL RE-DRAW VIDEO POKER SIDE BET

(75) Inventor: Stacy A. Friedman, Beaverton, OR (US)

(73) Assignee: Olympian Gaming LLC, Beaverton, OR (US)

( * ) Notice: Subject to any disclaimer, the term of this patent is extended or adjusted under 35 U.S.C. 154(b) by 189 days.

(21) Appl. No.: 13/079,805

(22) Filed: Apr. 4, 2011

Related U.S. Application Data

(60) Provisional application No. 61/321,115, filed on Apr. 5, 2010, provisional application No. 61/409,502, filed on Nov. 2, 2010, provisional application No. 61/420,756, filed on Dec. 7, 2010.

(51) Int. Cl.
*A63F 13/00* (2006.01)

(52) U.S. Cl. ........................................................ 463/12

(58) Field of Classification Search .................... 463/13
See application file for complete search history.

(56) References Cited

U.S. PATENT DOCUMENTS

2009/0121433 A1 * 5/2009 Snow et al. .................. 273/292

* cited by examiner

*Primary Examiner* — Peter DungBa Vo
*Assistant Examiner* — Jeffrey Wong
(74) *Attorney, Agent, or Firm* — Muskin & Cusick LLP

(57) ABSTRACT

A video poker game which can offer an optional side wager. The side wager will automatically play out a copy of the initial deal with optimal draw strategy for achieving a royal flush after the draw. If the player obtains a royal flush on the copy hand then the player wins a large bonus payout.

22 Claims, 6 Drawing Sheets

PRIOR ART

PRIOR ART

ROYAL RE-DRAW VIDEO POKER SIDE BET

CROSS REFERENCE TO RELATED APPLICATIONS

This application claims benefit to U.S. provisional application 61/321,115, filed Apr. 5, 2010, entitled "Video Poker Side Bet"; U.S. provisional application 61/409,502 filed Nov. 2, 2010, entitled "Video Poker Side Bet"; and U.S. provisional application 61/420,756, filed Dec. 7, 2010, entitled "Video Poker Side Bet". All such applications are incorporated by reference in their entirety for all purposes.

BACKGROUND OF THE INVENTION

1. Field of the Invention

The present general inventive concept is directed to a method, apparatus, and computer readable storage medium directed to electronic poker games with side wagers.

2. Description of the Related Art

Video poker games are known in the art. What is needed is a video poker game that can offer an additional wager in order to generate more excitement for the player as well as increased revenue for the casino.

SUMMARY OF THE INVENTION

It is an aspect of the present invention to provide flexibility and innovations in casino game play.

The above aspects can be obtained by a method for playing a video poker game comprising the steps of (a) a processing unit configured to operate with an output device and an input device, the processing unit configured to execute instructions to perform: (b) receiving from a player a main wager and a side wager; (c) determining randomly and outputting on the output device an initial hand to the player; (d) receiving a selection of hold cards from the player; (e) replacing non-hold cards in the initial hand to form a final hand; (f) determining royal flush optimized hold cards for the initial hand; (g) determining and outputting a side bet hand comprising the royal flush optimized hold cards and additional cards needed to form a five card hand; (h) paying the player any earned award based on a rank of the final hand and the main wager using a main paytable; and (i) paying the player any earned award based on a rank of the side bet hand and the side wager using a side bet paytable.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
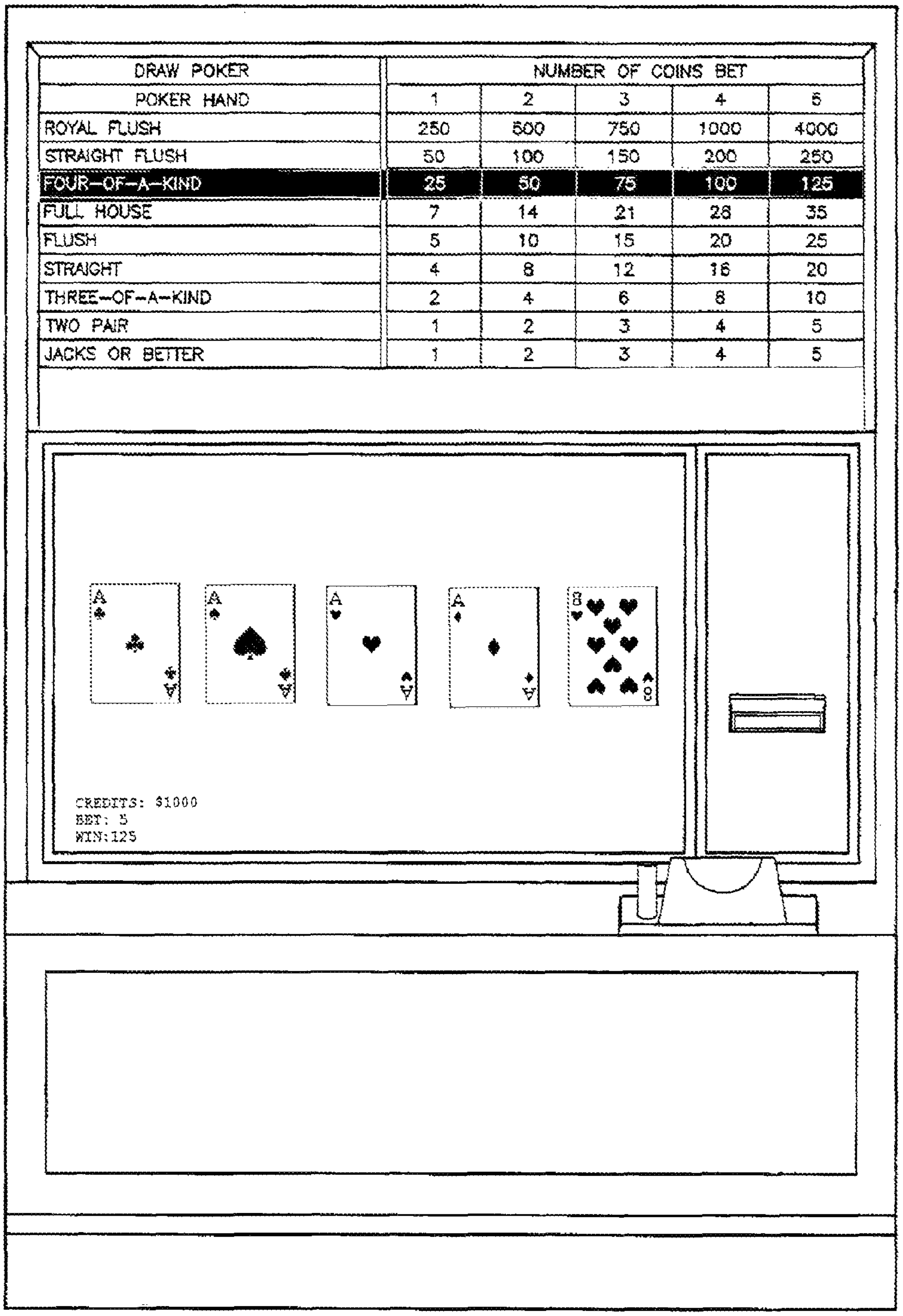
FIG. 1 is an example of a video poker machine of a type used herein.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a video poker machine game with a side wager.

FIG. 1 is an example of a video poker machine of a type used herein, according to an embodiment. In addition to stand-alone machines, other electronic devices or machines can be used as well, such as personal computers (which can be used to play video poker games using local software, or using client software which is connected to a remotely-located server hosting an online casino), a multi-game gaming machine (allowing the player to select from numerous different games including a game incorporating methods described herein), or any other known technology.

Figure 2:
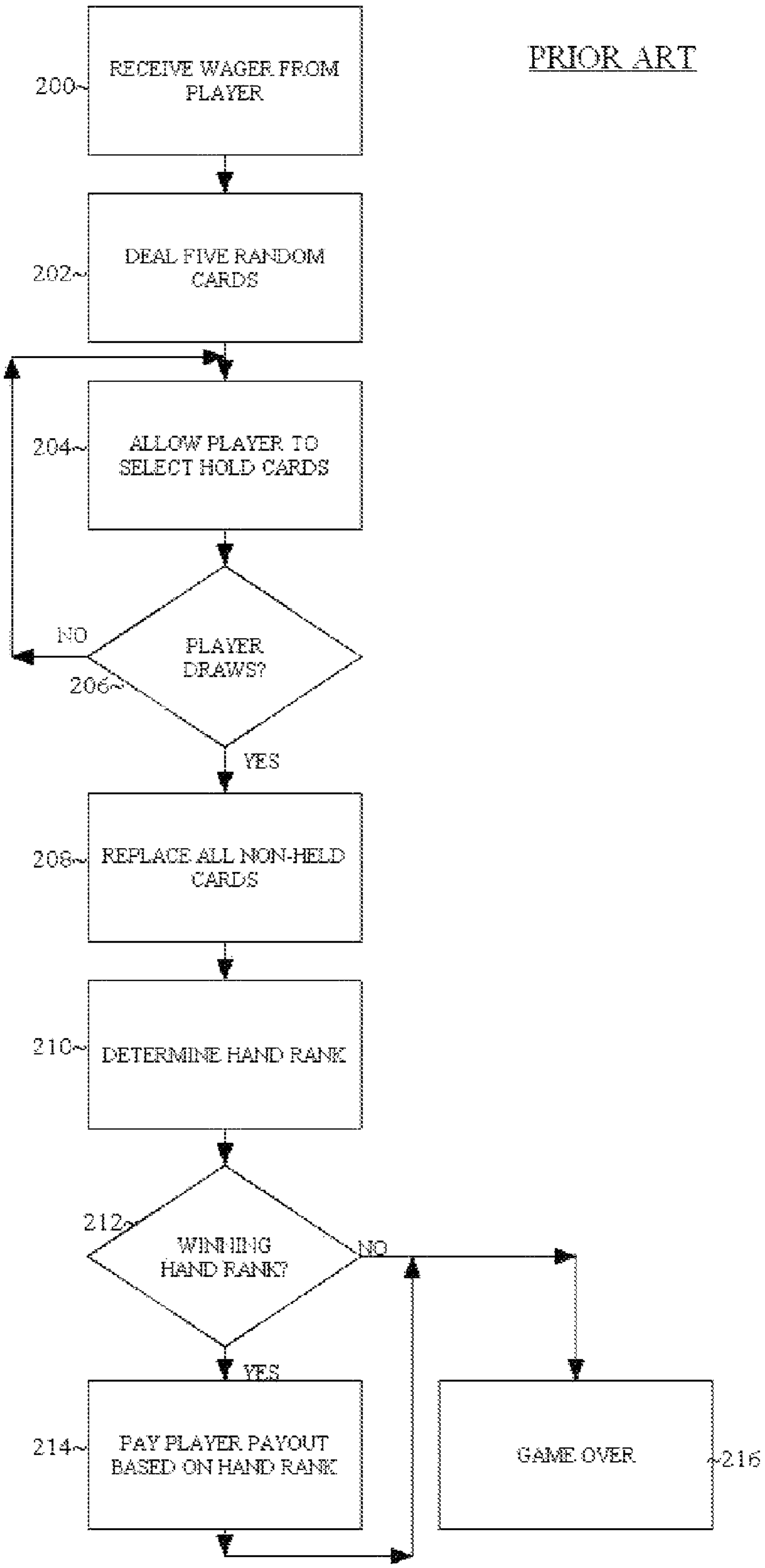
FIG. 2 is a flowchart illustrating play of a standard prior art video poker game.

FIG. 2 is a flowchart illustrating play of a standard prior art video poker game. Play can begin with operation 200, wherein the player places a wager. This can be done as known in the art, wherein the player deposits cash or a cashless voucher into the machine which credits the machine's credit meter for the appropriate amount. The player can then press a "bet" button on the machine which deducts a credit (or a bet amount of more than one credit) from the credit meter so that such amount can be used to purchase a game. The method then proceeds to operation 202, which deals five random cards from a deck of cards and displays them to the player. Once a card is removed from the deck and displayed it cannot typically be reused again; indeed, many gaming jurisdictions require that a virtual representation of a live gaming object, such as a deck of cards, must behave in the same way as the live gaming object. In other words, the probabilities when dealing from a virtual or electronically-implemented deck of cards representation must be equivalent to the probabilities when dealing from a physical deck of cards. The method then proceeds to operation 204, which allows the player to select zero or more hold cards (using a touchscreen or other input device(s), such as buttons), which are cards the player does not wish to discard. In operation 206, the player can draw by pressing a "draw" button, but until the player draws, the play can continue to select hold cards in operation 204. When the player draws, the method proceeds to operation 208, which replaces all non-held cards (all cards in the initial deal which are not hold cards) with newly dealt cards from the deck to create a final hand. Typically, the same number of cards that are discarded are replaced, because that number of replacement cards is sufficient to form a final hand of the desired size. A hand rank of the final hand is determined, and if it is a winning rank (based on a predetermined paytable), then the player is paid a payout in operation 214 based on the hank rank of the final hand and the amount wagered. If the hand rank is not a winning rank, then the game ends in operation 216 without the player winning anything (but having already paid for the game thus making it a loss). The player is then free to play again by returning to operation 200 and making a new wager. Note: in some video poker games, the "hold" and "discard" functionality is swapped such that the player must indicate which cards to discard rather than which cards to hold; however, the overall behavior of these games is equivalent to the method of FIG. 2. Occasionally, the player will choose to hold all five cards, thereby making the initial hand equal to the final hand and thus the "discard and redraw" step 208 operates on zero cards. That is, since there are no non-held cards to discard, there are no cards to replace.

In an embodiment of the present invention, in order to generate additional action (coin in) for the machine (and hence typically more profit), one or more extra credits can be taken as a side wager before the game begins. An extra credit (or credits) up front activates an automatic shot at drawing to a royal flush. The normal game plays as usual, with player hold/draw, but the extra credit activates a separate draw decision using the same cards and same remaining deck based on the best N-to-a-royal flush (or drawing all 5 if the initial hand contains none to a royal). Based on statistical analysis, the probability of a royal flush is roughly 1 in 23,000, so a suitable payout might be 20,000-to-1. Any appropriate pay, yielding a desired house advantage, can be used based on the chances of the outcome. For example, a payout of 22,500 to 1 results in a house edge of approximately 2.5%, or equivalently a payback of 97.5%, if no lower awards are offered.

Method of Play:

1) Player makes N credit wager on standard video poker (VP) hand and M credit wager on side bet 2) Player receives initial 5 cards as a first hand.

3) Player holds desired cards in first hand according to standard strategy.

4) In a second hand copy of the initial 5 cards, the best cards to a royal flush are automatically held. The player does not need to interact with the second hand.

5) In the first hand, the player's chosen discards are replaced, and the resulting final first hand is paid according to the main paytable and N-credit wager.

6) In the second hand, the automatic discards are replaced, and the resulting final second hand is paid according to the secondary (bonus) paytable and M-credit wager.

In many cases, the final second hand payout will be disbursed by hand (a "hand pay") rather than by adding credits to the machine's meter. This is often due to regulatory concerns with large amounts of money. However, the player is still being paid the appropriate amount (minus, perhaps, any mandatory tax withholding). In step 6 above, the discards may be drawn according to several methods. The first method is from a freshly-shuffled 47-card deck (or 48-cards if there is a joker) containing all but the initial 5 cards. The second method is from a deck without the initial cards and also without the cards drawn as replacements to the first (main) hand. This method sometimes makes it impossible to draw the royal on the 2nd hand, however, since in the cases where a needed card is drawn on the first hand, it is not available on the second. The third method is that the cards drawn to the second hand are exactly the same cards as would have been drawn to the first hand, had the "best draw to a royal flush" strategy been employed. Unlike the first method, this approach guarantees that a player who intentionally draws to a royal on his main hand and wins, will also win on the side bet. On the other hand, it also guarantees that a player who intentionally draws to a royal flush on his main hand and loses will also lose the side bet. In another embodiment, a hybrid replacement/draw method may be used. For example, if the player's main hand did result in a royal flush, then the second hand can automatically use the same replacement cards and will therefore win the royal flush as well; however, in the case where the player's main hand did not result in a royal flush, then different (e.g. random) replacement cards can be used, enabling the player to still have a shot at the royal on the side bet—indeed, the chances of this method producing a royal flush will be slightly improved when compared to the first method. In another embodiment, if the player did draw to a royal on the main hand (that is, held N cards to a royal flush), and did not hit it but received one additional card to the royal, the second hand may incorporate this additional drawn card before it draws its own replacement cards; in other words, in this embodiment, the draw is done using the best final cards to a royal flush, not just the best initial cards. An example will be provided herein. Because these approaches increase the probability of the royal flush on the side bet, the payout(s) may need to be adjusted (e.g. lowered) accordingly. In still further embodiments, the number of replacement cards drawn to the second hand can result in more than five cards and a corresponding higher probability of the royal flush and, likely, lower awards.

The main paytable may be unchanged from standard VP (e.g. Jacks or Better, Deuces Wild, whatever the base game is), or may be adjusted. The side bet is independent of the main game.

The secondary paytable can either be all-or-nothing (e.g. 20,000-to-1 for Royal Flush, 0 otherwise), or a paytable with more than one winning outcome. A multiple-outcome paytable will be useful if players desire more frequent wins on other awards as they're going for the royal flush. An example of such a bonus paytable might be:

| | |
|---|---|
| Royal Flush | 10,000-to-1 |
| Straight Flush | 100-to-1 |
| Flush | 10-to-1 |
| Pair of 10s or better | 1-to-1 |

Another example, more directly based on getting close to a royal flush, would be:

| | |
|---|---|
| Royal Flush | 10,000-to-1 |
| 4-to-a-royal | 1000-to-1 |
| 3-to-a-royal | 25-to-1 |
| 2-to-a-royal | 1-to-1 |

The secondary/bonus paytable can contain any awards chosen by the designer of the game to maximize player acceptance of the wager, but in any event, the strategy played on the initial hand (against which this secondary paytable will be applied, whatever it contains) is that the best N cards to a royal flush are held. Several examples of hold strategies of the best N cards to a royal flush are:

a) Ah 6c 6d 6h 6s (pat four of a kind): hold Ah b) Ac Ad Ah Ad Kd (pat four of a kind): hold Ad Kd c) Ac Kd Qh Js Ts (pat straight): hold Js Ts d) Kh Qh Jh Th 9h (pat straight flush: hold Kh Qh Jh Th e) 9h 8c 7c 6h 3c: discard all In rare circumstances, there may be two equally-likely draws to a royal, for example Ah Kh Qc Jc 5s. If the paytable is "Royal flush pays 22,500-to-1, otherwise nothing", then the choice can be made randomly between Ah Kh and Qc Jc, or by some other predetermined method (e.g. pick in suit-order, such as spades first, then hearts, diamonds, clubs—in this case, the chosen cards would be Ah Kh). If the paytable has other awards in it, then ideally the proper strategy would be chosen to maximize the expected value of the other awards in the paytable. In the same example hand, if a straight had a non-zero award in the secondary paytable, then holding Qc Jc would be a better play due to the slightly better chances of drawing a straight while holding Qc Jc vs. Ah Kh. But the best cards to a royal flush is still the overall strategy, so the strategy would not hold Ah Kh Qc Jc since the chances of a royal with that selection are zero.

The side bet may be a progressive jackpot as well; for example, in a paytable with only one award (the royal flush), the jackpot may start at 20,000 coins and accrue 10% of each coin wagered toward the progressive meter. This has a payback of 96.65% (or a house edge of 3.35%), and because the probability is 1 in 23,081, the average value of the progressive meter when hit will be 22,308 coins. As an alternate configuration, the jackpot may start at 15,000 coins (which is 65% payback by itself) and accrue 30% of each coin wagered, for a payback of 95% and an expected jackpot of 21,924. Such a progressive jackpot may be configured as is known in the art, and managed by electronic progressive-jackpot wagering systems which are also known in the art.

The side bet can easily apply to multi-hand poker games, such as described in U.S. Pat. No. 5,823,873 to Ernest Moody. Additionally, or alternatively, the player may purchase more than one secondary draw with their side wager. For example, if the player wagers 10 coins on the hand, the first 5 could play according to normal rules against the pre-existing paytable, but then the player could also earn 5 draws to a royal (five chances using the same initial cards and initial hold strategy, but 5 different draws with 1-coin wager values each, rather than one single draw with a 5-coin wager value).

Alternative display methods are possible. For example:

1) Player makes N coin wager on standard VP hand and M coin wager on side bet

2) Player receives initial 5 cards as a first hand.

3) Player holds desired cards in first hand according to standard strategy.

4) In the first hand, the discards are replaced (but visually displayed as being kept underneath the replacement cards), and the resulting final first hand is paid according to main paytable and N-coin wager.

5) After the first hand is completed, the replacement cards are removed and the original cards restored to the hand, returning the hand to its pre-draw state. At this point, the best cards to a royal flush are held (automatically, without player interaction), the discards are replaced, and the resulting final second hand is paid according to the secondary paytable and M-coin wager.

In another alternate embodiment, the display method may go as follows:

1) Player makes N coin wager on standard VP hand and M coin wager on side bet

2) Player receives initial 5 cards as a first hand.

3) The best cards to a royal flush are copied to a secondary location on the screen, leaving blank spaces for any remaining cards (up to 5, if no cards are copied)

4) Player holds desired cards in first hand according to standard strategy.

5) In the first hand, the discards are replaced and the resulting final first hand is paid according to main paytable and N-coin wager.

6) After the first hand is completed, enough cards to fill in the second hand are dealt to the secondary location, and the resulting final second hand is paid according to the secondary paytable and M-coin wager.

Here are several examples of game play walkthroughs:

Example 1:

1) Side bet paytable is 20,000-to-1 for royal flush, 0 otherwise. Player makes 5 coin main wager and 1 coin side wager.

2) Player's initial hand is Ac Kc Js Jh Jd

3) Player holds Js Jh Jd and presses draw button

4) Ac Kc are discarded and replaced with 3c Jc for a final hand of 3c Jc Js Jh Jd. Player wins appropriate 4-of-a-kind award for their main wager.

5) The original initial hand is re-displayed in a distinct area of the screen and the cards Ac Kc are automatically held.

6) Automatically, Js Jh Jd is discarded and Tc Jc Qc is drawn, giving the player's $2^{nd}$ hand a royal flush. Player wins 20,000 coins for the 1 coin side wager.

Alternately, steps 5 and 6 may be:

5a) The cards Ac and Kc are re-displayed in a distinct area of the screen

6a) Since only two cards were copied, three more cards are drawn—in this example, Tc Jc Qc is drawn, giving the player's $2^{nd}$ hand a royal flush. Player wins 20,000 coins for the 1 coin side wager.

Example 2:

1) Side bet paytable is 20,000-to-1 for royal flush, 0 otherwise. Player makes 5 coin main wager and 1 coin side wager.

2) Player's initial hand is Kc 8c 7c 8s 7s. Above this, in smaller cards, is a copy of the hand.

3) Player holds 8c 7c 8s 7s and presses draw button

4) Kc is discarded and replaced with 3h for a final hand of 3h 8c 7c 8s 7c. Player wins appropriate two-pair award for their main wager.

5) The smaller copy of the initial hand is played out: Kc is held, while 8c 7c 8s 7s are discarded and replaced with Ac Jc Qc 4c for a flush. Since this second hand is not a royal flush, the side bet loses.

Example 3a, using a hybrid approach:

1) Side bet paytable is 20,000-to-1 for royal flush, 0 otherwise. Player makes 5 coin main wager and 1 coin side wager.

2) Player's initial hand is Kc Ac Qc Jc 7s. Above this, in smaller cards, is a copy of the hand.

3) Player holds Kc Ac Qc Jc and presses draw button 4) 7s is discarded and replaced with 3h for a final hand of Kc Ac Qc Jc 3h. Player loses.

5) The smaller copy of the initial hand is played out: Kc Ac Qc Jc is held, 7s is discarded and replaced with a random card (5c). Since this second hand is not a royal flush, the side bet loses.

Example 3b, also using a hybrid approach:

1) Side bet paytable is 20,000-to-1 for royal flush, 0 otherwise. Player makes 5 coin main wager and 1 coin side wager.

2) Player's initial hand is Kc Ac Qc Jc 7s. Above this, in smaller cards, is a copy of the hand.

3) Player holds Kc Ac Qc Jc and presses draw button 4) 7s is discarded and replaced with Tc for a final hand of Kc Ac Qc Jc Tc—a royal flush.

5) The smaller copy of the initial hand is played out: Kc Ac Qc Jc is held, 7s is discarded and replaced non-randomly with the same card as was drawn in the main hand (Tc), and therefore the royal flush is drawn again so the side bet wins.

Example 4, using the best-cards-to-a-royal in the final main hand rather than the initial hand:

1) Side bet paytable is 20,000-to-1 for royal flush, 0 otherwise. Player makes 5 coin main wager and 1 coin side wager.

2) Player's initial hand is Kc Ac Qc 7h 7s. Above this, in smaller cards, is a copy of the hand.

3) Player holds Kc Ac Qc and presses draw button 4) 7h 7s are discarded and replaced with Tc 3c for a final hand of Kc Ac Qc Tc 3—a flush, but also 4-to-a-royal.

5) Because the player improved the chances to a royal on the draw (four cards to a royal vs. the initial three cards), the smaller copy of the final hand is played out as Kc Ac Qc Tc is held, 3c is discarded and replaced randomly. If the Jc is drawn, the side bet would win.

The main hand and second hand should be visually displayed in a way that makes it clear to the player that they are making an attempt to draw a royal flush based on the initially-dealt cards (or final cards, as the case may be). The second hand cards may be displayed as miniatures, copied into another row, restored after the main hand is played out, or another method. The second hand (draw to the royal) may be played before, after, or concurrently with the draw made by the player on the main hand. Regardless of when the second hand is played (drawn to), there is no need for player interaction or strategic decision since the strategy is always, in these embodiments, "try to draw to a royal flush"

Figure 3:
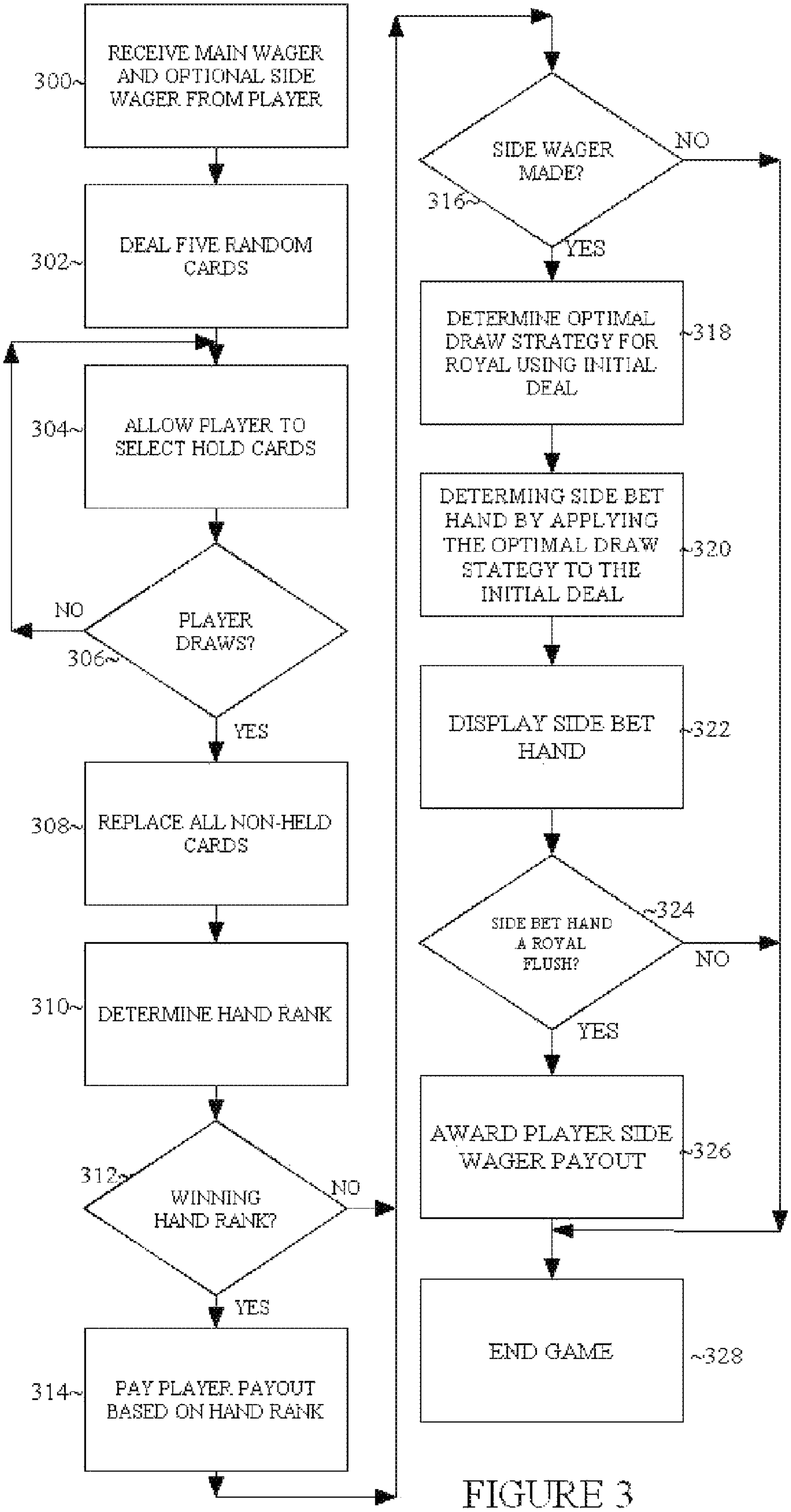
FIG. 3 is an exemplary flowchart illustrating a method of implementing a video poker side bet, according to an embodiment.

FIG. 3 is an exemplary flowchart illustrating a method of implementing a video poker side bet, according to an embodiment.

The method can begin with operation 300, which receives a main wager from the player and an optional side wager from the player. The player can indicate that he or she wishes to place the optional side wager by using buttons or other controls on the machine, which may include a touch-screen or pointing device (such as a mouse or other cursor control). The amount of the side wager can be a single coin or multiple coins.

From operation 300, the method proceeds to operation 302, which deals five random cards to the player forming the initial hand.

From operation 302, the method proceeds to operation 304, which allows the player to select hold cards (using buttons, a keyboard, mouse, touch-screen, etc.). If the player selects a card which is already a hold card, this typically serves to de-select that card and it is no longer a hold card. The player can experiment with different hold strategies. Once the player is satisfied with his or her choice of hold cards (cards which are not hold cards are non-held cards, also known as discards). If the player wishes to hold all of the five initial cards, the player can select all five cards as hold cards and draw.

From operation 304, a determination can be made in operation 306 whether the player draws (e.g. presses a draw button). If not, then the method can return to operation 304 wherein the player can continue to select his or her hold cards. When the player draws, the method proceeds to operation 308, which replaces all of the non-held cards (discards) with newly dealt cards from the deck (random cards), forming a final hand.

From operation 308, the method proceeds to operation 310, which determines a hand rank of the final hand. This can be done as known in the art, by comparing the composition of the final hand to predetermined ranks to see if the final hand comprises one of the predetermined ranks. From operation 310, the method proceeds to operation 312, which determines if the winning hand rank is a winning rank. If so, then the method proceeds to operation 314, which pays the player a payout based on the winning hand rank and the amount of the main wager (placed in operation 300).

From operation 312 or 314, the method proceeds to operation 316, which determines if the side wager was made (in operation 300). If not, then the method proceeds to operation 328, wherein the game ends.

If the side wager was made, then the method proceeds to operation 318, which determines an optimal draw strategy to achieve a royal using the cards from the initial deal. This can be calculated by cycling through all of the 32 different draw strategies, and then replacing the discards with every possible card combination, until the probability of getting a royal flush is computed (the number of royal flushes divided by the number of possible combinations of replacement cards). The draw strategy (out of the 32) with the highest probability of obtaining the royal flush can be used. In the case of a tie (two or more draw strategies have an equal chance of getting a royal), then a random strategy can be used. The cards that are determined that should be held to optimize the chances of getting a royal flush can be called "royal flush optimized hold cards." The royal flush optimized hold cards may also be determined with a look up table, or other suitable algorithm for arriving at the best draw strategy to achieve the royal flush. One alternate algorithm is to count the number of royal cards (cards in a royal flush, A, K, Q, J, and 10) in each suit, and select as hold cards the royal cards of the suit with the most royal cards present. Ties may be resolved as described herein.

From operation 318, the method proceeds to operation 320, which applies the draw strategy determined in operation 318 to the initial cards (dealt in operation 302). In one embodiment, the held cards (using the draw strategy from operation 318) can be copied in a separate area on the output display, and then a sufficient cards are dealt to form a hand of exactly five cards, forming the final side bet hand. This assumes, of course, that the final side bet hand will have the same number of cards as the initial hand; in some embodiments of the current invention, it is possible to have a final hand with a greater or lesser number of cards than the initial hand (either on the main wager or on the side wager). For example, the deal may be 5 initial cards; then the discard is up to 5; then the redeal deals a sufficient number of cards up to a 7 card hand—that is, always deal at least 2 additional cards even if the initial 5 were held. In that case, the sufficient number of cards would be 7—(# of held cards), whereas for a typical 5 card final hand, the sufficient number would be 5—(# of held cards), in both cases because the starting hand had 5 cards. Generally, if an initial hand is of size X, a final hand is of size Y, and N cards are held from the initial hand, the number of cards sufficient to complete the final hand is Y-N. This can be the case for either the second hand, the main hand, or both. It is noted that regardless of how the additional cards are determined (based on one of the multiple methods disclosed herein for determining replacement cards, including a hybrid method), duplicate cards are typically not allowed (if playing with a single deck); that is, the same card cannot appear twice in the same hand (whether the hand is the side bet hand or the main hand). This restriction would not ordinarily preclude the same card from appearing once as a replacement card in both the main hand and side bet hand; however, alternate replacement/draw methods have been discussed herein.

From operation 320, the method proceeds to operation 322, which displays the entire side bet hand to the player. Operation 322 may actually be combined with operation 320.

From operation 322, the method proceeds to operation 324, which determines whether the side bet hand comprises a royal flush (a winning hand for the side bet). If not, the method proceeds to operation 328, wherein the player has lost the side wager and the game ends.

If in operation 324, it is determined that the side bet hand is a royal flush, then the method proceeds to operation 326, which awards the player a payout based on winning the side wager (e.g., if the side wager pays 40,000:1 on the side wager and the player obtained a royal flush on the side bet hand, then the player is paid 40,000 times the number of coins the player placed on the side wager in operation 300).

It is also noted that in operation 324, in addition to a royal flush, other ranks can also be winning ranks as well for the side bet. If the side bet hand forms any of these winning ranks for the side bet, then the method would proceeds to operation 326 which would pay the player a respective award based on the particular winning side bet hand.

Figure 4A:
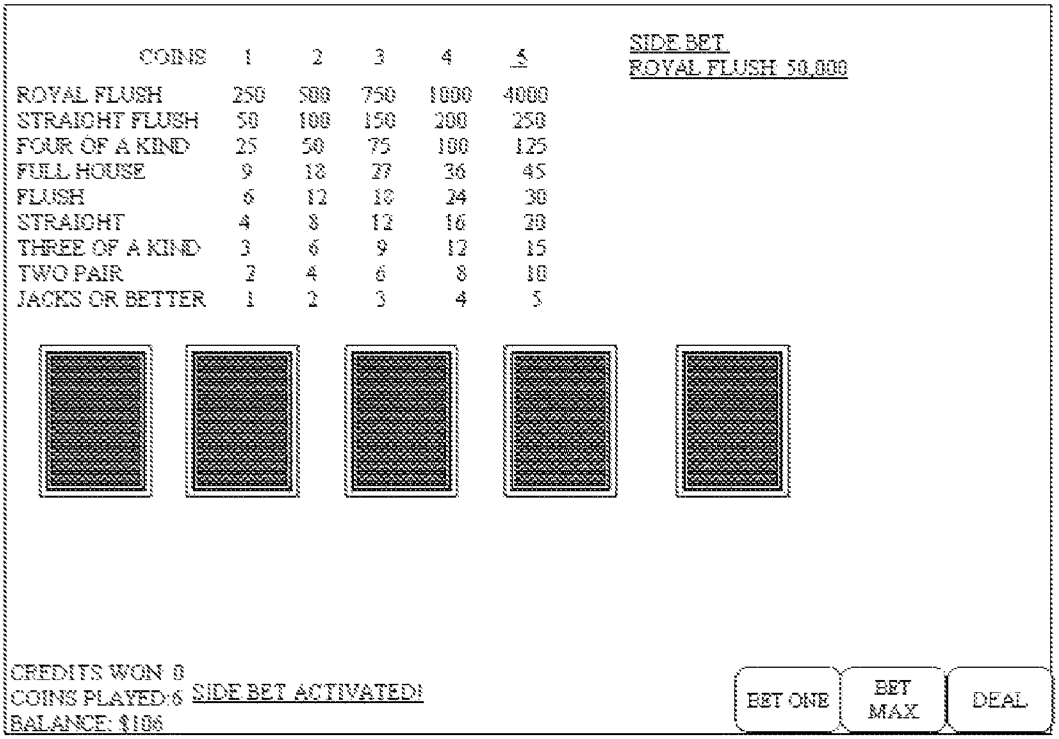
FIG. 4A is an illustration of a first stage of a video poker game, according to an embodiment.

FIG. 4A is an illustration of a first stage of a video poker game, according to an embodiment.

The player has placed (in operation 300) a 5 coin main wager (note the '5' is highlighted (underlined) to indicate five coins bet for the main wager) and an additional coin is bet for the side bet wager (totaling 6 coins—note the message "Side Bet Activated!" in the lower-left). The player then presses the 'deal' button to actually begin the game.

Figure 4B:
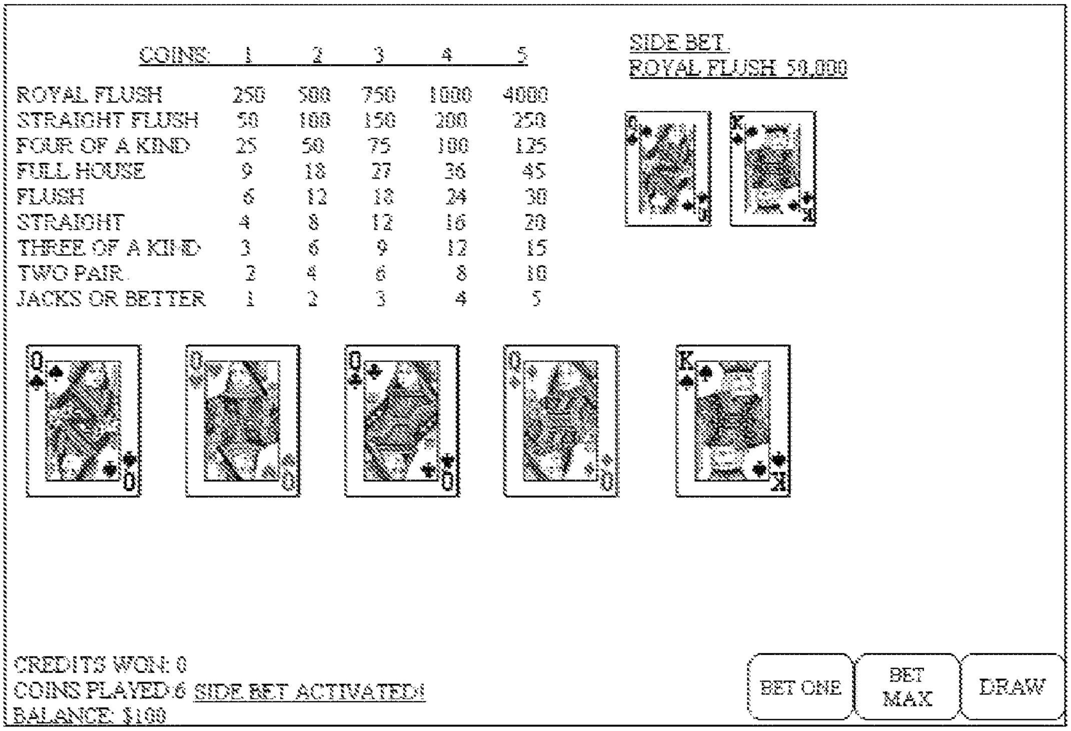
FIG. 4B is an illustration of a second stage of a video poker game, according to an embodiment.

FIG. 4B is an illustration of a second stage of a video poker game, according to an embodiment.

Note that the six coin wager is deducted from the player's credit meter (since 6 coins have been played, and since $6 has been deducted, one may deduce that this is a $1 denominated game). The player is dealt four queens and a king of spades (the initial hand in operation 302). The proper way to play this hand for the main game (involving the main hand) is of course to hold the four queens, which pays 125 coins. Whether the player wishes to hold the king of spades or not is immaterial.

The optimal draw strategy for this initial hand in order to obtain a royal flush is to hold the queen of spades and the king of spades. Of course, the player would not want to use this strategy in the main game because the player's expected value of the hand (a mathematical quantity describing the average payback value of the hand) is much better by holding the four queens. However, if the goal is optimize the chance of drawing into a royal, holding the queen of spades and king of spades is the proper play because these cards comprise two cards to the royal (only three remaining cards are needed). The side bet hold cards (the cards that are held using the royal optimized draw strategy determined in operation 318) are displayed in the upper right of the output screen (the queen spades/king spades).

Figure 5A:
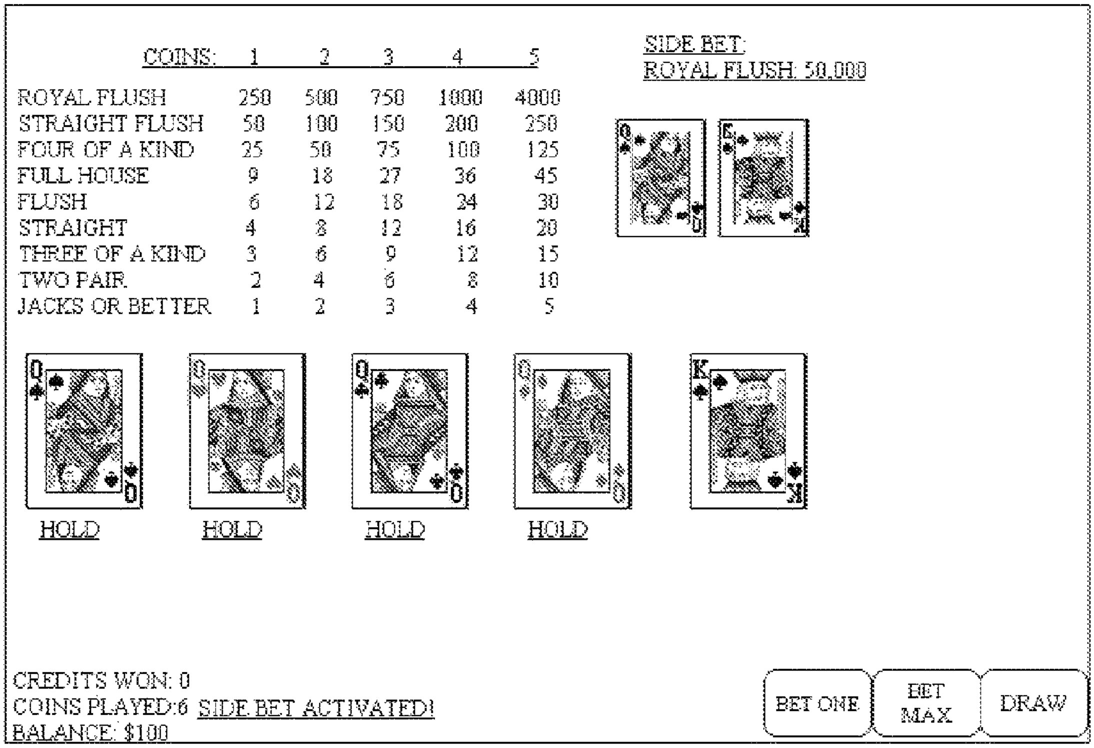
FIG. 5A is an illustration of a third stage of a video poker game, according to an embodiment.

FIG. 5A is an illustration of a third stage of a video poker game, according to an embodiment.

The player decides to hold all of the queens by touching the four queens, changing those cards' status to hold cards (indicated by the 'hold' under each of those cards). The player decides to discard the king of spades. The player now presses the 'draw' button.

Figure 5B:
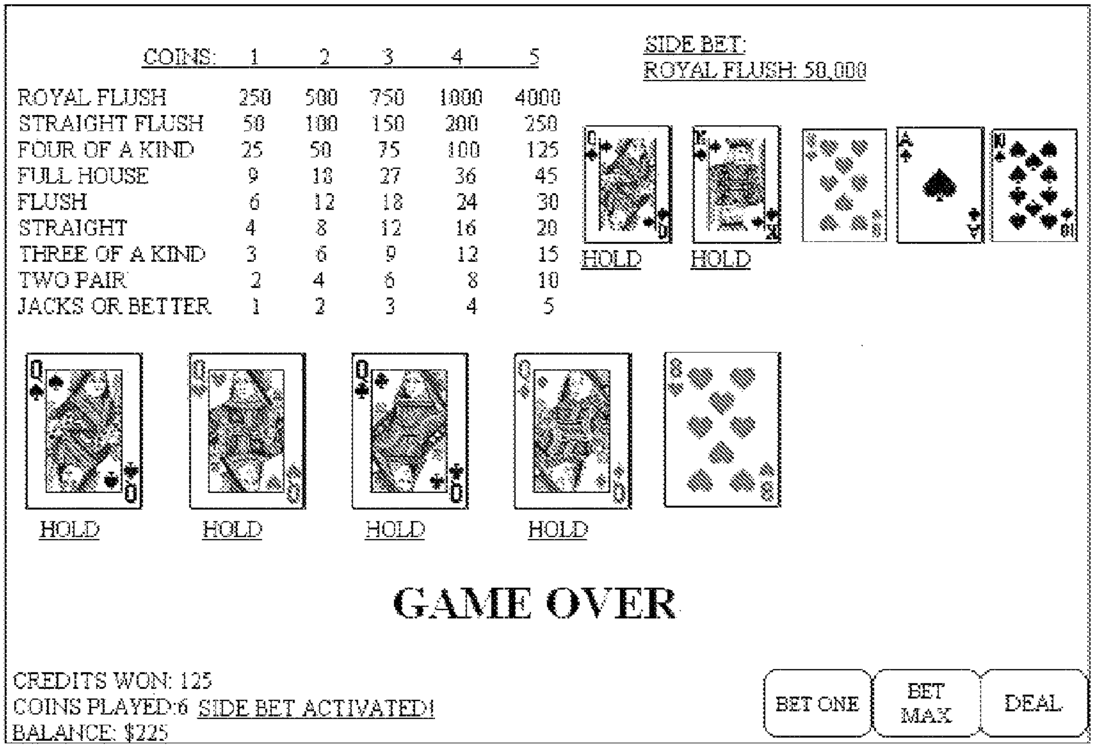
FIG. 5B is an illustration of a fourth and final stage of a video poker game, according to an embodiment.

FIG. 5B is an illustration of a fourth and final stage of a video poker game, according to an embodiment.

The player's main hand replaces the king spades with the eight of hearts, resulting in a final hand of four queens, which pays 125 coins. The side bet hand also draws three cards, an eight hearts/ace spades/ten spades. Note that in this embodiment, the same cards that would be drawn in the main game are also used for the side bet hand draw. This is draw method three described above. Thus, the eight of hearts is the card on the top of the deck in the main game and was drawn in the main game. The side bet hand also draws this card the cards immediately behind it in the deck (ace spades/ten spades). Thus, if the player were to redraw all five cards in the main game, then the player would be dealt an eight of hearts/ace spades/ten spades/and two more cards. In this embodiment, the player gets on the side hand exactly the same hand that the player would have gotten if the player would have used the same draw strategy as in the main hand. As discussed above, in other embodiments, different methods of determining the draw cards in the side bet hand can be used.

In a further embodiment, the deck used for the side bet hand can be a different type of deck than used in the main game. In other words, normally a standard 52-card deck is used for the deal, and the same deck of 47 remaining cards is used for the draw. In several embodiments, the composition of the deck used for the draw is different from the composition of the deck used for the initial deal minus the five cards initially dealt. For example, while the hold cards in the side bet hand will be determined solely based on the initial hand, the replacement cards can be dealt from a special type of deck for example a deck with three (or any number of) additional wild cards or jokers. The wild cards are mixed randomly in with the deck and thus the player may or may not get a wild card on the side bet hand, yet the player is not playing with a wild deck in the main hand and thus cannot get a wild card on the main game. Any secondary (draw) deck composition may be used, including wild cards, additional royal flush cards, etc. The composition of the secondary deck may include all of the remaining 47 cards not used during the initial draw, or it may eliminate certain of these (for example, all 3s and 4s are removed), add certain cards, or any combination of adding and removing cards. The composition of the secondary deck may also be dynamically computed based on the royal flush optimized hold cards (for example, if the side bet hold cards are Ah Kh Qh, then the secondary deck may be adjusted to include additional copies of Jh and Th, thereby increasing the chances of the royal flush). A special paytable can be used in such embodiments, for example:

| Hand | Payout |
|---|---|
| Natural royal flush (no wilds) | 10,000:1 |
| Royal flush (1 wild) | 5,000:1 |
| Royal flush (2 wilds) | 2,000:1 |
| Royal flush (3 wilds) | 500:1 |

It is also noted that the concept of modifying the deck from which replacement cards are drawn in video poker games may be extended to any video poker game, with or without the side bet feature described herein. For example, in a standard "Jacks-or-Better" video poker game, the initial draw may come from a standard 52-card deck, but the replacement cards may come from the remaining 47 cards with the addition of three more aces and two wild cards for a total of 52 cards in the special replacement deck. Also, as above, the composition of the secondary replacement deck may be dynamically computed based on the player's hold cards. For example, if the player holds three 5s and discards two cards, normally there is only one 5 remaining in the remaining 47 cards; however, in one embodiment the replacement deck may additionally include three more 5s. In another embodiment, in a special "bonus" mode, the replacement deck may include only 5s, thereby guaranteeing that the player wins. In another embodiment, in another bonus mode, the cards to be used as replacements are non-randomly re-ordered in the replacement deck (i.e. the secondary deck is "stacked") to either increase or decrease the chances of the player winning an award. Such altered decks may be available all the time, only during bonus rounds or modes, only during casino marketing promotions such as tournaments, or only upon redemption of special bonus vouchers or codes, etc.

It is noted that in a normal poker game, adding cards, removing cards, or intentionally reordering (stacking) the deck are all considered cheating; however, that is because those actions are done in a clandestine manner to the benefit of one player at the expense of another. In embodiments of the present invention, the player would be notified that, for example, the deck is being stacked in his or her favor (via, in one example, the addition of extra royal flush cards). It is anticipated that the player would look favorably upon such a feature. In still other embodiments, the player may accumulate the ability to stack the deck in his or her favor (and/or utilize any of the other altered deck composition methods herein) and redeem them as desired. For example, a player may earn the option to add an extra Ace into a deck of cards, but may save it until the player has earned five such options, upon which the "extra Aces" are redeemed all at once. Then, for example, the next hand of cards could be dealt from a 57-card deck containing 9 aces.

Furthermore, the dynamically computed deck modifications described above may be extended to any electronically-implemented card game. For example, in an electronically-implemented blackjack game, a bonus mode may dynamically modify the remaining deck to contain additional aces every time the player's first card is a 10-value card, thereby increasing the probability of blackjack. In another example, a bonus or promotional mode for blackjack may dynamically modify the remaining deck to contain additional 10-value cards if the player's initial hand is a total of 10 or 11, thereby increasing the probability of a good hand upon doubling-down. Such in-game deck manipulations are not practical (or, in many cases, legal) in a physically-based game of blackjack, baccarat, or other card games using physical cards, but may be implemented using virtual representations of cards using a method such as: (1) deal one or more initial cards according to predetermined rules; (2) based on existing cards and, optionally, wager amounts, adjust the composition (and potentially the order) of the remainder of the deck; and (3) deal one or more additional cards from the adjusted remainder of the deck, according to predetermined rules. This general method may be adapted to either increase or decrease the chances of a player achieving a specific hand or hands, which will allow casino game designers additional flexibility in payout amounts for those hands. This is advantageous over existing casino card game methods, which are limited to using static, fixed-content decks of cards (typically 52 standard playing cards with a known distribution) and therefore, a fixed set of hand outcome probabilities. Therefore, the deck in an electronically-implemented card game may be "stacked" or otherwise modified (cards added or removed) in a dynamic manner, allowing adjustable hand outcome probabilities and therefore much greater flexibility in game design than with a static, fixed deck of cards. As above, such modifications may be accumulated by the player and redeemed according to established rules.

This methodology may be extended to other electronic games as well, including non-card games such as slot machines, dice, or any other game where a game outcome is partially revealed before being completely revealed, and wherein the criteria for completing the revelation of the outcome may be adjusted dynamically and conditionally based on a computation including the partial revelation and optionally other information such as a paytable or a player's wager amount. For example, in a computer-implemented game of craps, a shooter with a point of 10 may find his dice modified such that the "one" face on one die is replaced with a "six" face, thereby increasing the probability of "making the point of 10" and decreasing the probability of "severing out".

In another example, a slot machine game may dynamically compute the probability of a symbol appearing on the second reel based on whether that symbol appeared on the first reel. Typically, electronic, RNG (random number generator) controlled slot machine games have a set of virtual reels which are spun according to random numbers generated by the RNG. For example, a typical video slot machine game with 5 reels may have 48 symbols on each reel strip. When a game is initiated, the game obtains from the RNG five random numbers in the range 1.48 and uses those to determine which reel stop (position) will appear on the screen. The positions of the symbols on the screen determine whether an award or awards are won. In a slot machine embodiment of the dynamic probability method described herein, all five random numbers would not necessarily be drawn at once. Moreover, there may be multiple reel strip options available for each reel on the screen. Thus, a slot machine according to an embodiment may utilize the following generic method: (a) randomly spin a first set of reels (one or more); (b) based on the partial outcome or symbols on the first set of reels, select a second set of reels from multiple possible sets of second reels (e.g. each with different symbol distributions, and thus, different probabilities of completing a paying outcome based on the first set of reels); (c) randomly spin the second set of reels; (d) repeat steps a-c for additional dynamic decision points; and ultimately (e) determine whether there is a winning outcome and pay it according to known methods. Thus, for example, the probability of a "seven" symbol appearing on the second reel of a slot machine may vary depending on whether a like "seven" symbol has already been determined to appear on a first reel, because (for example) the determination of a seven symbol on the first reel causes the game to spin a second reel with more seven symbols (or fewer) on it than it would otherwise have. Thus, given the generic steps of (1) partially reveal a gaming outcome by obtaining a random value or values from a particular random distribution or source of gaming randomness (e.g. a virtual deck of cards, virtual dice, slot machine reels, a generic RNG), (2) based on the partially-revealed gaming outcome, select a different random distribution (e.g. modified deck of cards, different slot machine reels, RNG with different range of outcomes, etc), and (3) reveal the remainder of the gaming outcome by obtaining a random value from the different random distribution, this generic method can apply to card games, slot games, or any other wagering proposition (such as bingo) wherein the outcome may be revealed in steps or stages.

Advantageously and non-obviously, such a dynamic adjustment of the random gaming elements (deck of cards, dice, slot machine reels, other random gaming distribution, etc.) may prove to be uniquely acceptable within the electronic gaming domain in spite of the fact that "stacking the deck" or "loading the dice" in a physical game would ordinarily be considered cheating. As described above, such dynamic adjustment or modification of the source of gaming randomness or gaming elements can be communicated to the player and therefore form a known part of the game rules.

The embodiments of the present invention may also be adapted to a marketing promotion or other bonus, wherein the player does not necessarily make an additional wager from his or her own funds but may nevertheless still be eligible for the royal flush re-draw method as described herein. For example, a marketing promotion may provide 100 free re-draws at the royal flush as described herein (in any embodiment) via the existing slot machine bonusing system. A player may activate the bonus mode in a method as known in the art (e.g. by interacting with the player tracking console typically on each machine, or by inserting a bonus-activating ticket or code), and subsequent plays on the video poker machine may automatically give the player chances to win the royal flush as described herein without further investment, except by wagering the provided promotional credits. In such an embodiment, the player would play the normal five credits on the video poker wager, but would receive a free (bonus) draw to the royal flush as part of a marketing promotion as if he had played a sixth bonus credit. Thus, the activating credit (or credits) wager for the bonus game may be automatically provided by the casino, rather than explicitly provided by the player in the form of a cash wager. In another embodiment, the entire play can be activated for free, including the main wager, and the player can still be playing as if he had wagered six credits. In short, the wager that activates the play of the main game, side game, or both may be provided by either the player or the casino, or some combination thereof.

It is also noted that, while the embodiments herein have been directed to a side bet which automatically draws to a royal flush, any other target hand rank may be used. For example, in certain wild card video poker games, 5-of-a-kind is a desirable hand. The methods described herein may be used to offer a side bet which draws to a side bet hand using "five of a kind optimized hold cards." Any other target hand or range of target hands may be used for the side bet, including any straight flush, any four of a kind, only certain ranks of a four of a kind (e.g. 4 aces), only certain suits of straight flushes, etc. The drawing strategy for such a target hand (or range of hands) would produce "target hand optimized hold cards" and, as described herein, the target hand optimized hold cards can be selected to optimize the probability of the target hand, can be selected to maximize the expected value of any other awards in the secondary paytable, etc.

In an embodiment, a side bet for video poker automatically holds the best N cards to four-of-a-kind (that is, the most numerous rank in the initial hand), and the replacement deck comprises the 47 remaining cards of the initial deck and an additional single card of the rank held, making it possible to achieve 5-of-a-kind even when no wild card is present. In an alternate embodiment, the replacement deck is an entirely new deck of 52 cards, or alternately the replacement deck comprises the remaining 47 cards with additional copies of the cards held by the side bet strategy. These embodiments make it more likely that the side bet will achieve 4-of-a-kind or 5-of-a-kind, since there are more cards of the rank held than in the typical 47-card replacement deck. In any of the aforementioned N-of-a-kind embodiments, the side bet paytable may pay (for example) 5,000-to-1 for 5-of-a-kind, 50-to-1 for 4-of-a-kind and 5-to-1 for 3-of-a-kind; an alternate paytable would be 15,000-to-1 for 5-of-a-kind and nothing otherwise. Paytable values may be adjusted as known in the art, taking into consideration probabilities of underlying events, desired house edge figures and other gameplay design constraints.

Figure 6:
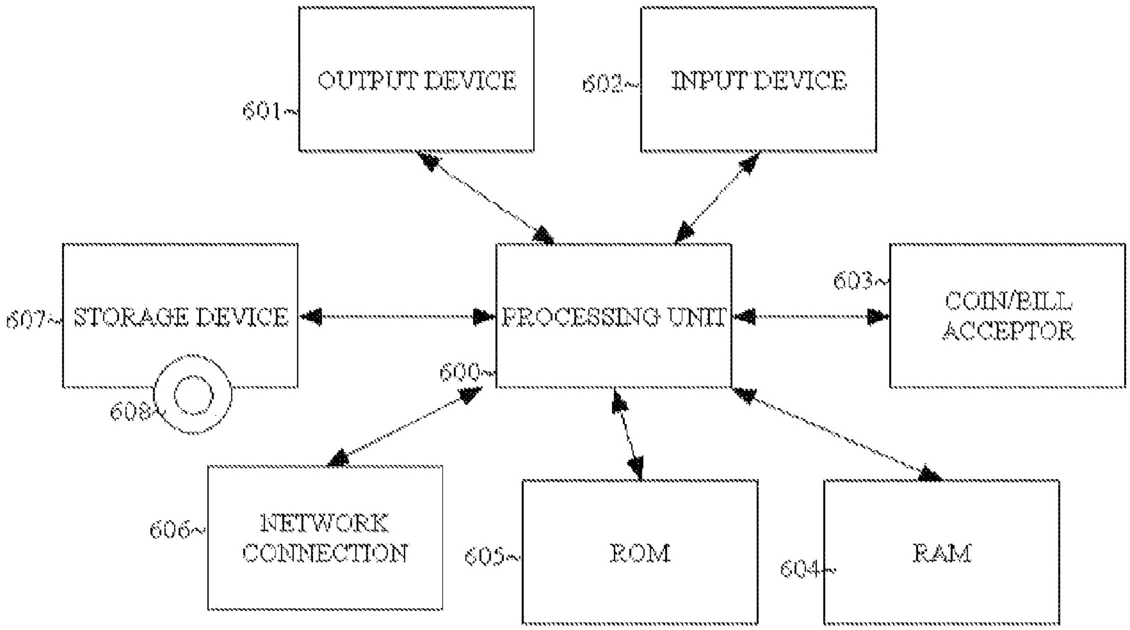
FIG. 6 is a block diagram illustrating hardware that can be used to implement an electronic gaming machine, according to an embodiment.

FIG. 6 is a block diagram illustrating hardware that can be used to implement an electronic gaming machine, according to an embodiment.

A processing unit 600 can be a microprocessor and any type of associated components (e.g., cache, bus, etc.) The microprocessor is connected (directly or indirectly) to an output device 601 (e.g., touchscreen, speakers, reels, CRT, etc.) an input device 602 (e.g., touchscreen, keyboard, mouse, etc.), a coin/bill acceptor 603 (which can also accept cashless tickets or electronically encoded payments cards), a RAM 604, a ROM 605, a network connection 606 (connecting the slot machine to any type of network such as a LAN, WAN, wifi, etc.), and a storage device 607 which can store programs and/or data to implement any of the methods described herein on a storage medium 608. The input device can be activated by a player to initiate gameplay, and the output device (e.g. display device) can be used to display cards, credit amounts, paytables, and the like. The input device (or a different input device) can also be used to interact with the game as it is being played, for example, to indicate held cards or adjust the credit amount of a wager.

Additionally, the methods and embodiments of this invention may be embodied in a remote gaming system, such as an Internet casino website involving a computer server with a processor running software to implement the methods herein, connected to a data network (such as the Internet), which is in turn connected to a remote personal computer consisting of a processor, visual display, and at least one input device such as a mouse, keyboard, or touchscreen. In this usage, the personal computer can be said to be a gaming device. Alternative embodiments include server-based gaming systems, comprising electronic gaming terminals in gaming locations which are connected via network to a central server for various aspects of functionality, including game software downloads and/or central-determinant random outcome generation. These are known in the art as Server-Based Gaming Systems and System-Supported Gaming Systems (SBGS and SSGS). Alternative embodiments include a mobile client device, such as a smartphone or tablet computer using either commodity or purpose-built hardware, connected wirelessly to a gaming server, wherein the mobile client device accesses the gaming server and receives gaming outcomes in a similar fashion as an Internet casino. In several of these configurations, the processor which actually executes the game play functionality is physically separate from the display device which displays the game play results to the player, as well as the input device(s) with which the player interacts. In many such configurations, there is no coin/bill acceptor present in the system; instead, currency is electronically transferred to an account maintained by a central server. Any remote gaming devices, including personal computers or mobile devices running software, may be configured to perform the methods described herein.

It is also noted that any and/or all of the above embodiments, configurations, variations of the present invention described above can mixed and matched and used in any combination with one another. This also includes any prior document incorporated by reference, and any feature described herein can also be applied to any such documents. Any claim herein can be combined with any others (unless the results are nonsensical).

Moreover, any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

A standard 52 card deck can be used or any special decks can be used, such as deck with one or more wild cards, duplicated cards, or "missing" cards (cards removed which would normally be part of a standard 52 card deck). Any paytable award described herein may be associated with a variable progressive jackpot award and accompanying system or controllers, as known in the art.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, the apparatus comprising:
- a processing unit configured to operate with an output device and an input device, the processing unit configured to execute instructions to perform:
- receiving from a player a main wager and a side wager;
- after receiving from the player the main wager and the side wager, determining randomly and outputting on the output device an initial hand to the player;
- receiving a selection of hold cards from the player;
- replacing non-hold cards in the initial hand with random replacement cards to form a final hand;
- determining a main wager outcome by evaluating a rank of the final hand, comparing said rank to a main wager paytable, and paying the player any earned award based on the main wager and said comparing;
- automatically determining royal flush optimized hold cards for the initial hand;
- automatically determining and outputting a side wager hand comprising the royal flush optimized hold cards and a sufficient number of additional cards; and
- determining a side wager outcome by evaluating a rank of the side wager hand, comparing said rank to a side wager paytable, and paying the player any earned award based on the side wager and said comparing, wherein the side wager paytable is different from the main wager paytable.

2. The apparatus as recited in claim 1, wherein the additional cards are randomly-selected independent of the replacement cards.

3. The apparatus as recited in claim 1, wherein the additional cards are identical to the replacement cards.

4. An electronic gaming apparatus comprising:
- a processor;
- an input device;
- a display device;
- at least one memory device;
- a main paytable, stored in a memory device;
- a bonus paytable, stored in a memory device, the bonus paytable different from the main paytable;
- wherein the processor is configured to execute instructions stored in a memory device to perform:
  - receiving a wager;
  - dealing a first hand of cards;
  - receiving a selection of zero or more first hold cards to be held from the first hand of cards;
  - forming a first final hand of cards using the first hold cards and sufficient randomly dealt first hand card(s);
  - determining a main payout amount using a rank of the first final hand of cards and the main paytable;
  - crediting the main payout amount for main payout amounts greater than zero;
  - determining zero or more target hand optimized hold cards based on the first hand of cards or the first final hand of cards;
  - forming a second final hand of cards using the target hand optimized hold cards and sufficient newly dealt second hand card(s);
  - determining a bonus payout amount using a rank of the second final hand of cards and the bonus paytable; and
  - crediting the bonus payout amount for bonus payout amounts greater than zero.

5. The electronic gaming apparatus of claim 4, wherein the determining is based on the first hand of cards.

6. The electronic gaming apparatus of claim 4, wherein the determining is based on the first final hand of cards.

7. The electronic gaming apparatus of claim 4, wherein the newly dealt second hand cards are dealt from a virtual standard 52-card deck from which have been removed card(s) in the first hand of cards.

8. The electronic gaming apparatus of claim 4, wherein the newly dealt second hand cards are dealt from a virtual standard 52-card deck from which have been removed card(s) in the target hand optimized hold cards.

9. The electronic gaming apparatus of claim 4, wherein, in the dealing a first hand of cards, cards are dealt from a virtual deck of cards with a first composition; wherein the sufficient newly dealt second hand card(s) are dealt from a virtual deck of cards with a second composition, the second composition being different from the first composition minus cards in the first hand of cards.

10. The electronic gaming apparatus of claim 9, wherein the second composition includes at least one wild card.

11. The electronic gaming apparatus of claim 9, wherein the second composition is dynamically determined based on the target hand optimized hold cards.

12. The electronic gaming apparatus of claim 4, wherein the target hand optimized hold cards are royal flush optimized hold cards.

13. The electronic gaming apparatus of claim 4, wherein the target hand optimized hold cards are five of a kind optimized hold cards, wherein the sufficient newly dealt second hand card(s) are dealt from a virtual deck of cards with at least one additional card matching a rank of a card in the target hand optimized hold cards.

14. The electronic gaming apparatus of claim 4, wherein the bonus paytable includes a progressive jackpot award.

15. The electronic gaming apparatus of claim 4, wherein the display device displays the first hand of cards in a different location than the second final hand of cards.

16. A method of operating a gaming device comprising:
- causing at least one display device to display a first hand of cards upon a wager by a player;
- accepting a selection of zero or more first hold cards to be held from the first hand of cards;
- causing the at least one display device to display a first final hand of cards using the first hold cards and sufficient randomly dealt first hand card(s);
- causing the at least one processor to determine a first payout amount using a rank of the first final hand of cards and a main paytable;
- causing the first payout amount to be credited to the player for first payout amounts greater than zero;
- causing at least one processor to execute instructions for a target hand optimal draw evaluation based on the first hand of cards or the first final hand of cards, resulting in a determination of target hand optimized hold cards;
- causing the at least one display device to display a second final hand of cards using the target hand optimized hold cards and sufficient newly dealt second hand card(s);
- causing the at least one processor to determine a bonus payout amount using a rank of the second final hand of cards and a bonus paytable, the bonus paytable different than the main paytable; and
- causing the bonus payout amount to be credited to the player for bonus payout amounts greater than zero.

17. The method of claim 16, wherein the target hand optimized hold cards are royal flush optimized hold cards.

18. The method of claim 16, wherein cards in the first hand of cards are dealt from a virtual deck of cards with a first composition; wherein the sufficient newly dealt second hand card(s) are dealt from a virtual deck of cards with a second composition, the second composition being different from the first composition minus cards in the first hand of cards.

19. The method of claim 16, which is provided through a data network.

20. The method of claim 19, wherein the data network is an internet.

21. The method of claim 16, wherein the target hand optimal draw evaluation is based on the first hand of cards.

22. The method of claim 16, wherein the target hand optimal draw evaluation is based on the first final hand of cards.

* * * * *